US008841792B2

(12) United States Patent
Teichman

(10) Patent No.: US 8,841,792 B2
(45) Date of Patent: Sep. 23, 2014

(54) WAVE ENERGY CONVERSION SYSTEMS AND METHODS

(71) Applicant: Chevron U.S.A. Inc., San Ramon, CA (US)

(72) Inventor: Jesse W. Teichman, San Ramon, CA (US)

(73) Assignee: Chevron U.S.A., Inc., San Ramon, CA (US)

( * ) Notice: Subject to any disclaimer, the term of this patent is extended or adjusted under 35 U.S.C. 154(b) by 0 days.

(21) Appl. No.: 13/866,945

(22) Filed: Apr. 19, 2013

(65) Prior Publication Data

US 2013/0277979 A1 Oct. 24, 2013

Related U.S. Application Data

(60) Provisional application No. 61/635,424, filed on Apr. 19, 2012.

(51) Int. Cl.
*F03B 13/12* (2006.01)
*F03B 13/24* (2006.01)

(52) U.S. Cl.
CPC . *F03B 13/24* (2013.01); *Y02E 10/38* (2013.01)
USPC .......................................................... 290/53

(58) Field of Classification Search
CPC ...................................................... F03B 13/10
See application file for complete search history.

(56) References Cited

U.S. PATENT DOCUMENTS

| 3,064,137 | A | * | 11/1962 | Corbett, Jr. et al. | 290/53 |
| 3,487,228 | A | * | 12/1969 | Kriegel | 290/52 |
| 3,922,739 | A | * | 12/1975 | Babintsev | 441/16 |
| 4,078,382 | A | * | 3/1978 | Ricafranca et al. | 60/398 |
| 4,178,517 | A | * | 12/1979 | Salomon et al. | 290/53 |
| 4,271,668 | A | * | 6/1981 | McCormick | 60/398 |
| 4,286,347 | A | * | 9/1981 | Modisette | 60/398 |
| 4,364,715 | A | | 12/1982 | Bolding | |
| 4,441,316 | A | * | 4/1984 | Moody | 60/398 |
| 4,719,754 | A | * | 1/1988 | Nishikawa | 60/501 |
| 5,701,740 | A | | 12/1997 | Tveter | |
| 5,770,893 | A | * | 6/1998 | Youlton | 290/53 |
| 7,059,123 | B2 | | 6/2006 | Welch | |
| 7,525,213 | B2 | * | 4/2009 | Nagata et al. | 290/53 |
| 2010/0320765 | A1 | * | 12/2010 | Folchert et al. | 290/53 |

FOREIGN PATENT DOCUMENTS

| GB | 2411928 A | * | 9/2005 | F03B 13/14 |
| GB | 2468864 A | * | 9/2010 | F03B 13/26 |
| WO | 2010144384 A1 | | 12/2010 | |

OTHER PUBLICATIONS

International Search Report of corresponding counterpart PCT application No. PCT/US2013/037473 dated Aug. 6, 2013.

* cited by examiner

*Primary Examiner* — Joseph Waks

(57) ABSTRACT

A system for producing an output from wave energy for use on an offshore, nearshore or onshore facility includes a support structure having a columnar volume with a first opening and a second opening and a movable piston plate housed therein; and a buoyant system surrounding the support structure, wherein the buoyant system is coupled to the piston plate by a linkage system, wherein the piston plate shifts in response to an oscillation of water level causing the buoyant system to shift, wherein air flow within the columnar volume varies in response to the oscillation of water level, and wherein such oscillation is realized at a prescribed rate controlled by a variable tuning orifice.

20 Claims, 6 Drawing Sheets

WAVE ENERGY CONVERSION SYSTEMS AND METHODS

CROSS-REFERENCE TO RELATED APPLICATIONS

This application claims priority under 35 U.S.C. §119(e) to U.S. Provisional Application Ser. No. 61/635,424, filed Apr. 19, 2012, the entirety of which is incorporated herein by reference.

TECHNICAL FIELD

The present application relates generally to use of renewable energy for power generation, water desalination, or pumping applications on offshore, nearshore or onshore oil and gas facilities. More particularly, the present application is directed to the use of low-head hydro-air turbines and linkage assemblies for utilizing wave-induced air pressure.

BACKGROUND AND SUMMARY OF INVENTION

Offshore oil and gas platforms have tremendous energy needs. For instance, the electrical loads on fixed and floating offshore facilities are typically supplied by fossil fuel-driven power generating equipment (e.g., diesel generators). Smaller loads, less than about 50 kW, are often supplied by small-scale renewable energy generators such as solar panels or micro-wind turbines. In addition, water desalination for human use, steam production to support oil and gas processing, hydrogen production, and assistance in treatment of exhaust or effluent contaminants typically uses large amounts of energy for removing salt and other minerals from saline water offshore.

Further, pumping applications, such as pumping of water into reservoirs, also require energy, and are commonly electrically driven as a result of fossil fuel combustion at the platform. However, the loads associated with these scenarios can be a large proportion of overall platform energy demand, and are not always critical bus loads. For instance, in some cases, a reservoir can lose pumping pressure for a week or more before economic harm ensues. Generally, pumping water requires the transport of fuel to a platform, combustion to generate power at about 25% to 35% busbar efficiency, and transmission of the power to the load, with inherent line loss and transformer loss. In addition, exhaust emissions and ancillary clean-up expenses such as reagent replenishment to a selective catalytic converter are associated with conventional pumping systems.

A variety of technologies have been investigated to capture energy from ocean waves for use offshore. One example is a point absorber, which is a floating structure with components that move relative to each other due to wave action (e.g. a floating buoy inside a fixed cylinder). Conventional point absorber power take-off (PTO) designs rely on hydraulic rams which pressurize accumulators for driving servomotors to convert mechanical energy into electricity. Other approaches seek to employ permanent magnet generators or linear induction generators for this purpose, but these applications are still at an early stage. However, hydraulic PTO designs may not be an optimal solution for point absorbers in some circumstances. Further, neither the hydraulic ram nor linear generator approach can enable direct drive of desalinization units or water pumping units.

Therefore, a need exists for an alternative to linear generators as a replacement for hydraulic ram PTO designs to capture energy from ocean waves.

In one aspect, embodiments disclosed herein relate to a system for producing an output from wave energy for use on an offshore, nearshore or onshore facility, the system comprising a support structure having a columnar volume with a first opening and a second opening and a movable piston plate housed therein, and a buoyant system surrounding the support structure, wherein the buoyant system is coupled to the piston plate by a linkage system, wherein the piston plate shifts in response to an oscillation of water level causing the buoyant system to shift, wherein air flow within the columnar volume varies in response to the oscillation of water level, and wherein such oscillation is realized at a prescribed rate controlled by a variable tuning orifice.

In other aspects, embodiments disclosed herein relate to a method for producing an output from wave energy for use on an offshore, nearshore or onshore facility, the method comprising the steps of incorporating a structural support having a columnar volume into said offshore, nearshore or onshore facility, wherein the structural support comprises a movable piston plate therein, wherein the structural support is surrounded by buoyant system that oscillates, wherein the piston plate is coupled to the buoyant system with a linkage system, wherein the buoyant system, linkage system, and piston plate move in response to wave energy, and wherein air enters a first opening and leaves from a second opening formed in a structural support of the facility in response to movement of the piston plate and incorporating a variable tuning orifice within the columnar volume of the support structure to finely regulate oscillation of the system.

BRIEF DESCRIPTION OF THE DRAWINGS

For a more complete understanding of the present invention, and the advantages thereof, reference is now made to the following descriptions taken in conjunction with the accompanying drawing, in which.

Figure 1A:
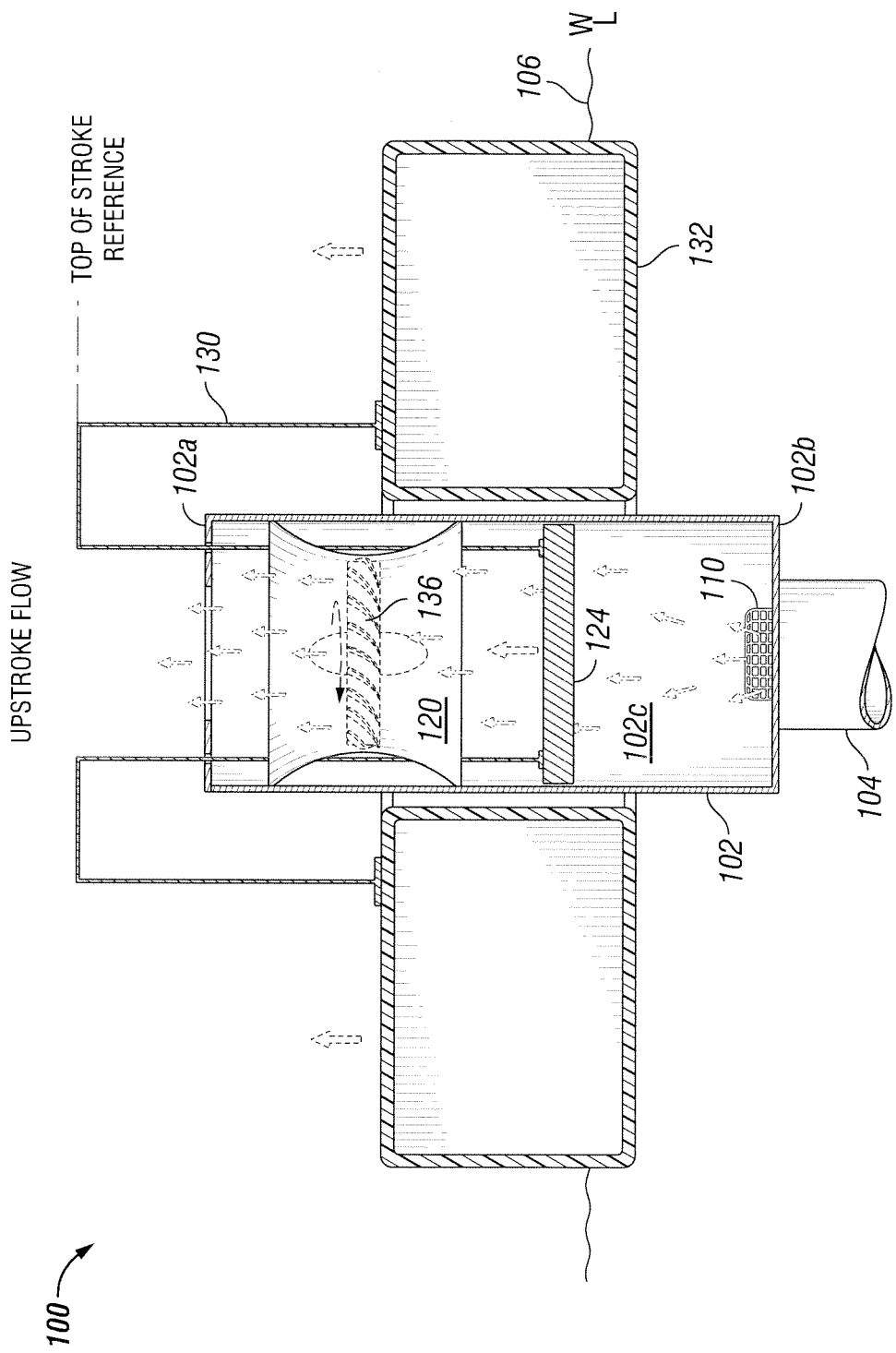
FIG. 1A is a schematic view of a power generating assembly and system with an air turbine positioned within a support structure, illustrating an upstroke flow, in accordance with one or more embodiments of the present invention.

It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, are merely intended to conceptually illustrate the structures and procedures described herein. Reference numerals may be repeated among the figures in order to indicate corresponding or analogous elements.

DESCRIPTION OF THE INVENTION

The present invention is directed to systems and methods that utilize wave energy for power generation, water desalination, or pumping applications for or otherwise associated with an offshore, nearshore or onshore facility. Generally, a linkage and piston-plate assembly is integrated into a point absorber wave energy converter (WEC) to create an oscillating air column (OAC) point absorber WEC. For power generation applications, the present invention utilizes wave energy to drive one or more air turbines, wherein such turbines can generate electrical power for use on or near the offshore, nearshore or onshore facility more cheaply than by conventional fossil-fuel generation systems, and without creation of greenhouse gasses or criteria pollutants. For water desalination applications, the present invention utilizes wave energy to remove some amount of salt and other minerals from saline water using a desalination unit to produce fresh water for consumption or use on or near the offshore facility. For pumping applications, the present invention utilizes wave energy to drive pumps.

1. Systems

Figure 1B:
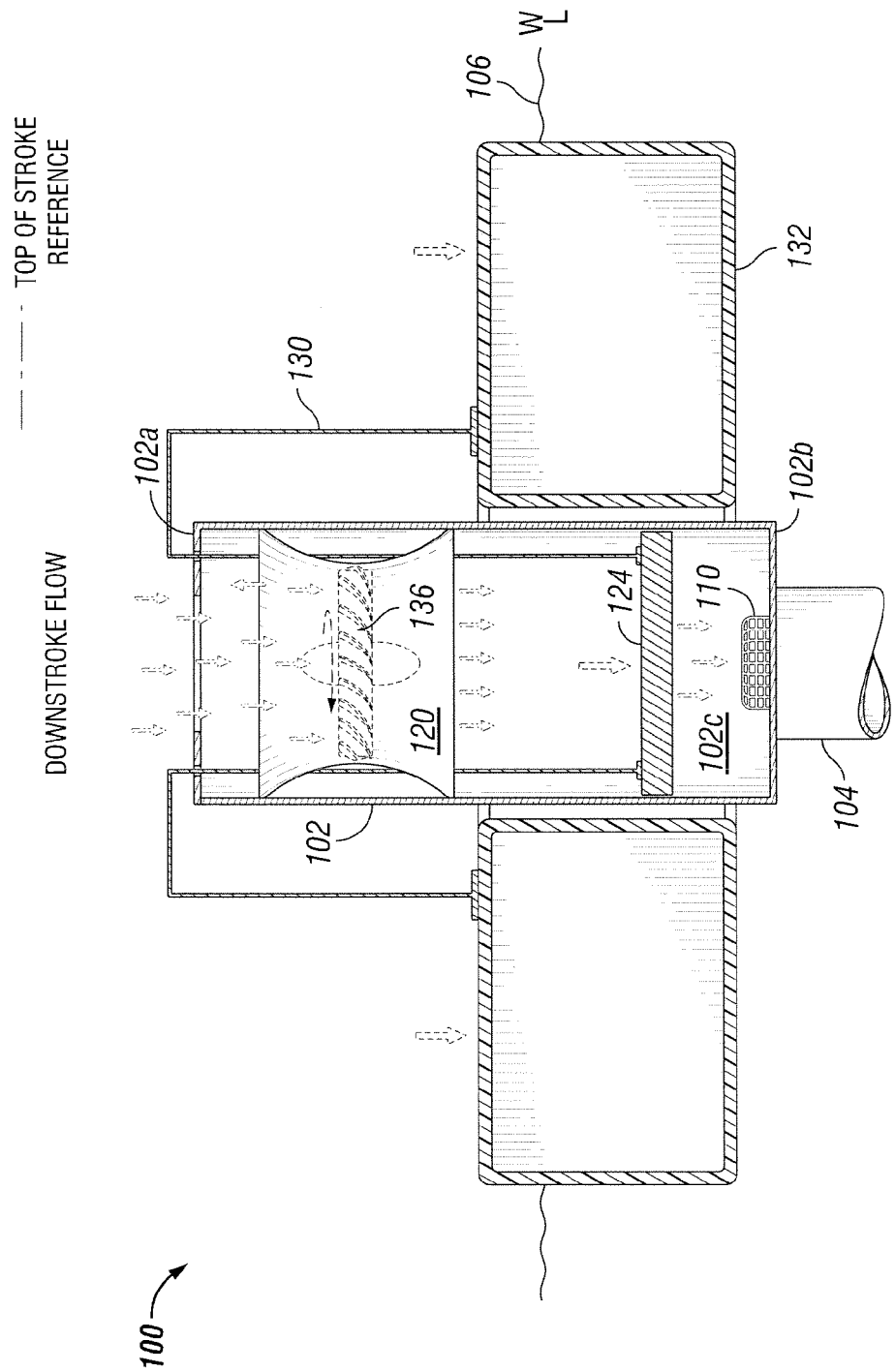
FIG. 1B is a schematic view of the power generating assembly and system of FIG. 1A, illustrating a downstroke flow, in accordance with one or more embodiments of the present invention.

Referring to FIGS. 1A-1B, an exemplary embodiment of a power generation system 100 is shown. The power generation system 100 includes a fixed or floating support structure 102 having an upper end 102a, a lower end 102b, and a hollow interior 102c therein. A cylindrical neck 104 extends from the lower end 102b of the support structure 102 in a direction from sea or water level 106 towards a sea floor (not shown). The hollow interior 102c of the support structure 102 defines a columnar volume with an opening 108 at the upper end 102a to ambient air above water level 106. Generally, the support structure 102 comprises several chambers joined by necks of smaller diameter. The lower end 102b of the support structure 102 includes a variable tuning orifice 110 for matching a frequency of the power generation system 100 to a frequency of ocean waves. The variable tuning orifice 110 will allow air to be bled either to other support structure 102 sections, or to the atmosphere, at a controlled rate so that a control air cushion can be maintained between a movable piston plate 124 and the ends 102a, 102b of the support structure 102. The variable tuning orifice 110 can be controlled by proprietary electronic or pneumatic algorithms. In certain exemplary embodiments, the support structure 102 is shielded from water such that only air can enter the variable tuning orifice 110. Damping of the system 100, to rapidly achieve the optimal level of resonance on a wave-to-wave basis, can also be achieved by varying the pitch of the air inlet and outlet.

A turbine 120 coupled to the movable piston plate 124 is housed in the columnar volume of the support structure 102 above the water level 106. In certain exemplary embodiments, the piston plate 124 is positioned at a lower end 120a of the turbine 120. A linkage system 130 couples the piston plate 124 to a Taurus ring 132 that surrounds the support structure 102. In certain exemplary embodiments, the linkage system 130 is a rigid system that allows the piston plate 124 to shift in response to movement of the Taurus ring 132 relative to the support structure 102. In certain embodiments, the linkage system 130 is a lever system. The Taurus ring 132 is generally a hollow buoyant system that moves in association with ocean waves. Power generation can be optimized by allowing the Taurus ring 132 to oscillate near the resonating frequency of the system 100, which is achieved by the interaction of linkage system 130, ballasting of the support structure 102, and highly granular real-time control of the turbine 120 and variable tuning orifice 110. These elements also provide a damping force to allow optimal resonance.

In certain exemplary embodiments, the turbine 120 is a single-stage or a multi-stage hydro-air turbine. The turbine 120 rotates in response to changes in the air pressure due to the movement of the piston plate 124 associated with the oscillating Taurus ring 132. In some embodiments, the turbine 120 is a unidirectional turbine, wherein such turbines rotate in response to changes in the air volume above the water level 106, and wherein the turbine 120 rotates in the same direction regardless of whether the volume of air is increasing or decreasing. In some embodiments, reciprocating turbines can be employed in lieu of, or in addition to, any unidirectional turbines so utilized.

Referring to FIG. 1A, during upstroke airflow, the Taurus ring 132 moves upward relative to the support structure 102, causing the piston plate 124 to also move upward within the support structure 102, and airflow moves in a direction from the lower end 102b towards the upper end 102a of the support structure 102. Referring to FIG. 1B, during downstroke airflow, the Taurus ring 132 moves downward relative to the support structure 102, causing the piston plate 124 to also move downward to create a vacuum within the support structure 102, and drawing ambient air from the upper end 102a towards the lower end 102b of the support structure 102. As the water level 106 rises and lowers with the waves, such an oscillating water level 106 results in a variable volume of air above the water level. Referring again to FIGS. 1A and 1B, a rotating alternator 136 (or other similar device) is mechanically driven by a shaft of turbine 120 to generate electricity responsive to the rotation of turbine 120. A power take-off cable (not shown) is connected to the rotating alternator 136, so that one or more electrical devices are in electrical communication with alternator 136.

Figure 2A:
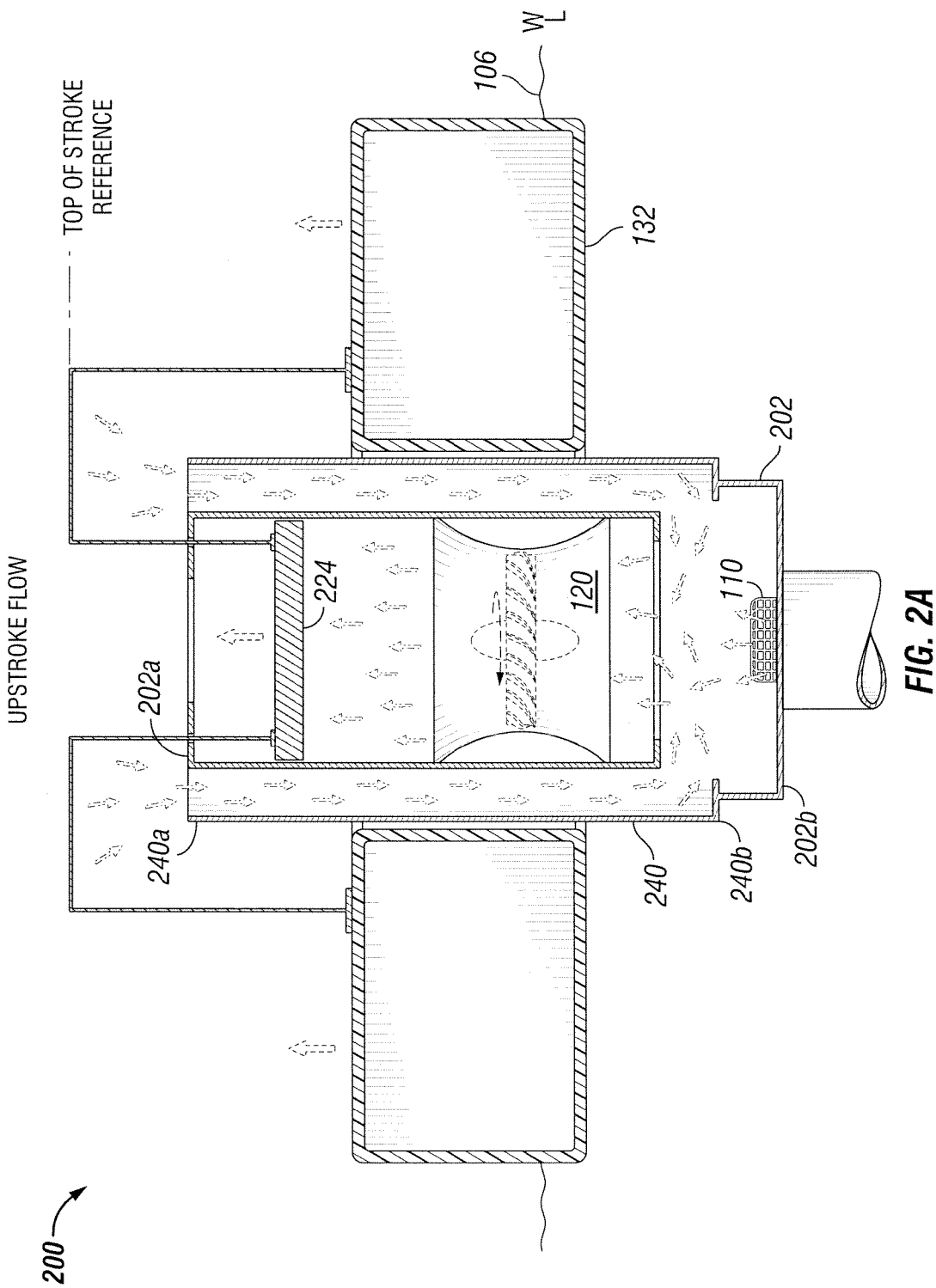
FIG. 2A is a schematic view of another power generating assembly and system with an air turbine positioned within a support structure, illustrating an upstroke flow, in accordance with one or more embodiments of the present invention.
Figure 2B:
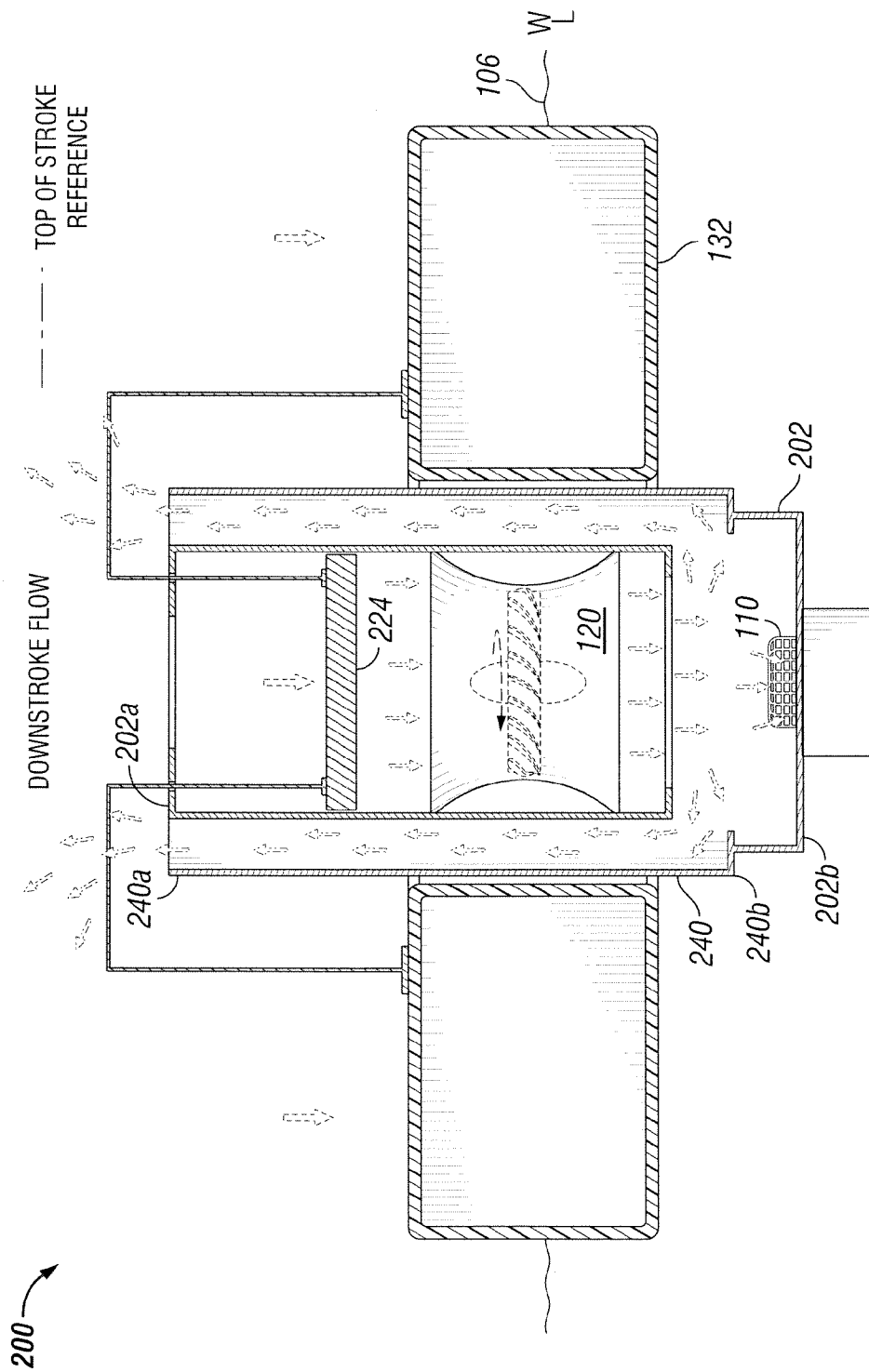
FIG. 2B is a schematic view of the power generating assembly and system of FIG. 2B, illustrating a downstroke flow, in accordance with one or more embodiments of the present invention.

Referring to FIGS. 2A and 2B, an exemplary embodiment of a power generation system 200 is shown. The power generation system 200 is the same as that described above with regard to power generation system 100, except as specifically stated below. For the sake of brevity, the similarities will not be repeated herein below. A support structure 202, similar to support structure 102, includes a plenum jacket 240 along an edge thereof, thereby increasing flow volume to the turbine 120 inside and/or outside of the support structure 202. A piston plate 224, similar to piston plate 124, is positioned above the turbine 120.

Referring to FIG. 2A, during upstroke airflow, the Taurus ring 132 moves upward relative to the support structure 102, causing the piston plate 224 to also move upward while the support structure 202 remains stationary. Air flows from an upper end 240a to a lower end 240b of the plenum jacket 240 and then into the columnar volume of the support structure 202. Additional air flows in a direction from a lower end 202b towards an upper end 202a of the support structure 202. Referring to FIG. 1B, during downstroke airflow, the Taurus ring 132 moves downward relative to the support structure 102, causing the piston plate 224 to also move downward. Air flows from the upper end 202a towards the lower end 202b of the support structure 202, and exits through the variable tuning orifice 110 and the plenum jacket 240. As the water level 106 rises and lowers with the waves, such an oscillating water level 106 results in a variable volume of air in the columnar volume of the support structure 202. Referring again to FIGS.

2A and 2B, as air flows across the turbine 120, electricity is generated in response to the rotation of turbine 120.

Figure 3:
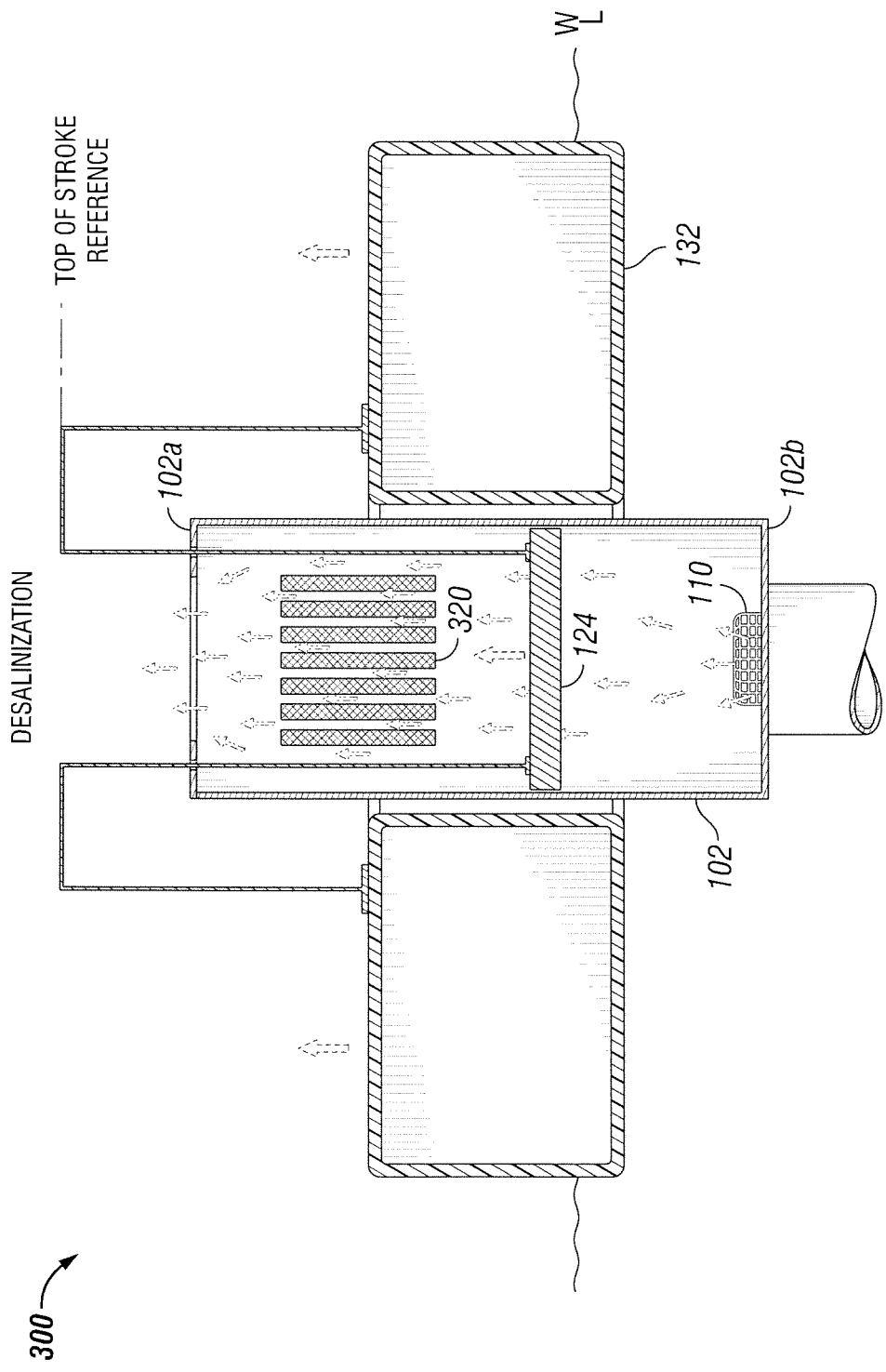
FIG. 3 is a schematic view of a desalination assembly and system with a desalination unit positioned within a support structure, illustrating an upstroke flow, in accordance with one or more embodiments of the present invention.

Referring to FIG. 3, an exemplary embodiment of a desalination system 300 is shown. The desalination system 300 is the same as that described above with regard to power generation system 100, except as specifically stated below. For the sake of brevity, the similarities will not be repeated hereinbelow. The turbine 120 is replaced with a reverse osmosis desalination unit 320. The support structure 102 also includes a water inlet to the desalination unit 320.

During upstroke airflow, the Taurus ring 132 moves upward relative to the support structure 102, causing the piston plate 124 to also move upward while the support structure 102 remains stationary, and airflow moves in a direction from the lower end 102b towards the upper end 102a of the support structure 102. Ocean water containing salts and other minerals flows from the lower end 102b, through the desalination unit 320 to produce fresh water, and is discharged at the upper end 102a of the support structure 102.

Figure 4:
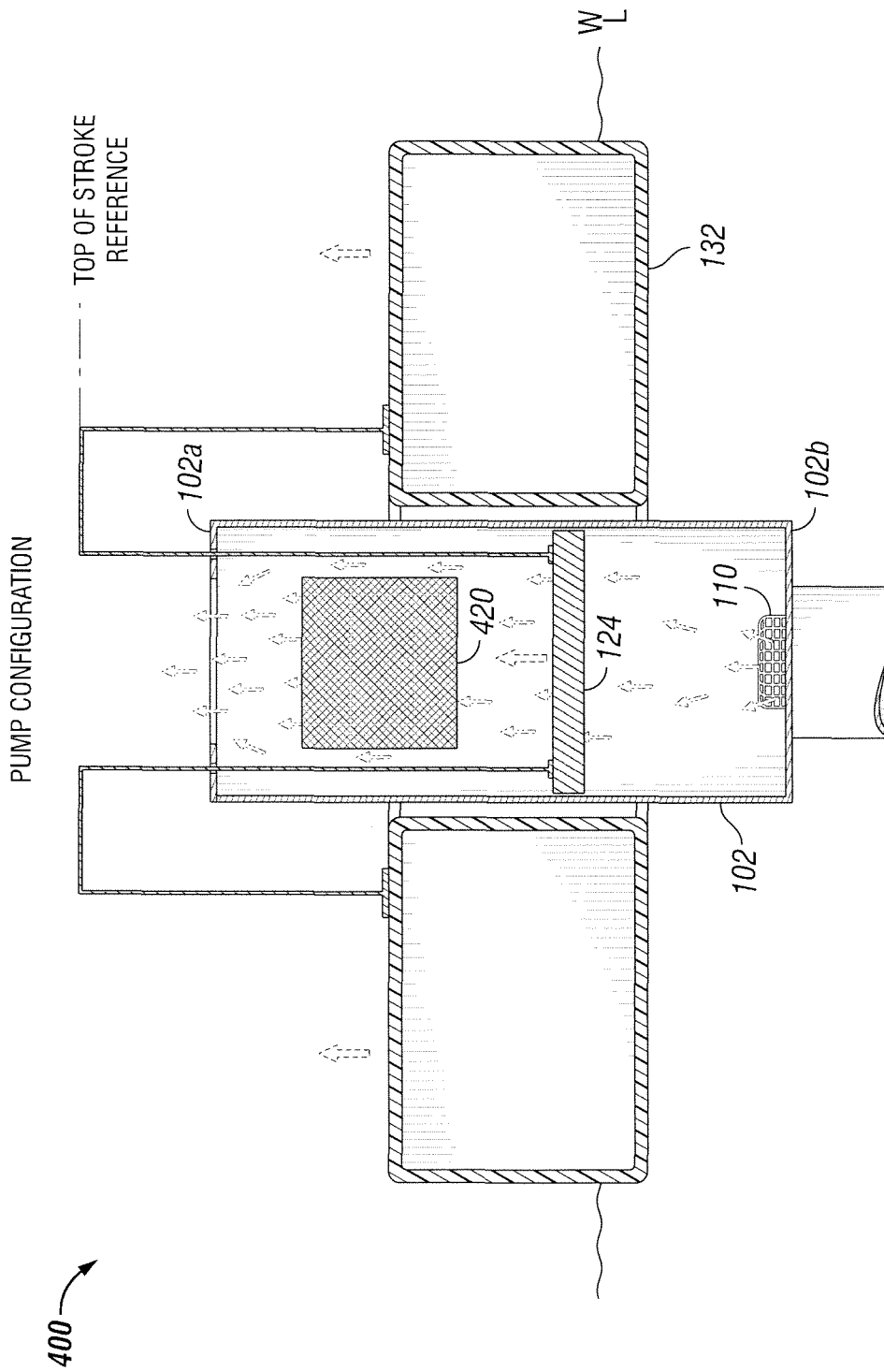
FIG. 4 is a schematic view of a pumping assembly and system with a pumping unit positioned within a support structure, illustrating an upstroke flow, in accordance with one or more embodiments of the present invention.

Referring to FIG. 4, an exemplary embodiment of a pumping system 400 is shown. The pumping system 400 is the same as that described above with regard to power generation system 100, except as specifically stated below. For the sake of brevity, the similarities will not be repeated hereinbelow. The turbine 120 is replaced with a water pumping unit 420. The support structure 102 also includes a water inlet to the water pumping unit 420.

During upstroke airflow, the Taurus ring 132 moves upward relative to the support structure 102, causing the piston plate 124 to also move upward while the support structure 102 remains stationary, and airflow moves in a direction from the lower end 102b towards the upper end 102a of the support structure 102. Seawater is pumped using the water pumping unit 420 from the lower end 102b and discharged at the upper end 102a of the support structure 102. Generally, the use of wave energy for pumping applications removes the fuel, exhaust, and systemic losses in exchange for intermittency of the energy.

In certain embodiments, the present invention relates to a system for producing power from wave energy for use on an offshore, nearshore or onshore facility, comprising a support structure having a columnar volume with a first opening and a second opening and a movable piston plate housed therein, a buoyant system surrounding the support structure, wherein the buoyant system is coupled to the piston plate by a linkage system, wherein the piston plate shifts in response to an oscillation of water level causing the buoyant system to shift, air flow within the columnar volume, the air flow varying in response to the oscillation of water level, wherein such oscillation is realized at a prescribed rate controlled by a variable tuning orifice, a turbine housed in the columnar volume of the support structure, the turbine rotates in response to air flow, a rotating alternator driven by the turbine, an air opening located above the turbine, and a power take-off cable connected to the rotating alternator to power one or more electrical devices associated with the facility.

In other embodiments, the present invention relates to a system for producing fresh water from seawater using wave energy, comprising a support structure having a columnar volume with a first opening and a second opening and a movable piston plate housed therein, a buoyant system surrounding the support structure, wherein the buoyant system is coupled to the piston plate by a linkage system, wherein the piston plate shifts in response to an oscillation of water level causing the buoyant system to shift, wherein such oscillation is realized at a prescribed rate controlled by a variable tuning orifice, air flow within the columnar volume, the air flow varying in response to the oscillation of water level, water flow within the columnar volume, and a desalination unit housed in the columnar volume of the support structure for removing salts and other minerals from seawater to produce fresh water.

In yet other embodiments, the present invention relates to a system for pumping water using wave energy, comprising a support structure having a columnar volume with a first opening and a second opening and a movable piston plate housed therein, a buoyant system surrounding the support structure, wherein the buoyant system is coupled to the piston plate by a linkage system, wherein the piston plate shifts in response to an oscillation of water level causing the buoyant system to shift, wherein such oscillation is realized at a prescribed rate controlled by a variable tuning orifice, air flow within the columnar volume, the air flow varying in response to the oscillation of water level, water flow within the columnar volume, and a pumping unit housed in the columnar volume of the support structure for pumping water.

The systems of the present invention can be used in any number of point absorber applications, including, but not limited to, offshore wave energy converters moored to the sea floor, wave energy converters integrated into on-shore wave barrages, wave energy converters integrated into fixed or floating offshore platforms, wind turbine support structures, ships, barges and floating production storage and offloading vessels, and bridges and piers. The systems described above are also easily adaptable for a variety of circumstances. For example, if a plurality of turbines is used, they could be used individually or in series. Also, structural and/or environmental restrictions may direct or otherwise dictate how air is introduced and discharged from the system.

2. Methods

In some embodiments, the present invention is directed to methods for producing power from wave energy for use on an offshore (including subsea), nearshore or onshore facility, the method comprising the steps of: (1) incorporating a support structure into an offshore facility, wherein air, driven by a movable piston plate that shifts in response to wave energy, enters and leaves from an opening that is integrated into the facility's structure; (2) utilizing the air flow to drive a turbine that is coupled with an electric power-generating device (e.g., a rotating alternator) so as to generate electric power; and (3) using (e.g., via a power take-off cable) the electric power to power devices on the offshore facility. In some embodiments, there are a number of power take-off scenarios. Such scenarios include, but are not limited to, (a) turbine direct drive of a generator, connected to battery storage or directly to a busbar load, and (b) turbine direct or electric drive of an air compressor for storage in an accumulator, wherein the air would be discharged on demand to drive either an in-leg turbine or a separate combustion turbine or air turbine for rapid power delivery to a bus. It is contemplated that, in some such embodiments, the compressed air from the accumulator will be used to increase the efficiency of combustion turbines or air turbines on the platforms by boosting the intake air pressure and/or temperature. In some embodiments, the method is capable of generating electrical power loads in excess of 50 kW. In some or other such embodiments, the method is capable of generating electrical power loads in excess of 100 kW.

In some embodiments, the present invention is directed to methods for desalinizing water using wave energy, the method comprising the steps of: (1) incorporating a structural support into an offshore, nearshore or onshore facility, wherein air, driven by a movable piston plate that shifts in response to wave energy, enters and leaves from an opening that is integrated into the facility's structure, and wherein seawater enters and leaves from an opening that is integrated into the facility's structure; (2) passing the seawater across a desalination unit so as to generate fresh water; and (3) discharging the fresh water for use.

In some embodiments, the present invention is directed to methods for pumping water using wave energy, the method comprising the steps of: (1) incorporating a structural support into an offshore, nearshore or onshore facility, wherein air, driven by a movable piston plate that shifts in response to wave energy, enters and leaves from an opening that is integrated into the facility's structure, and wherein water enters and leaves from an opening that is integrated into the facility's structure; (2) pumping the water using a water pumping unit; and (3) discharging the water for use.

In certain embodiments, the present invention is directed to a method for producing power from wave energy for use on an offshore, nearshore or onshore facility, the method comprising the steps of incorporating a structural support having a columnar volume into an offshore, nearshore or onshore facility, wherein the structural support comprises a movable piston plate therein, wherein the structural support is surrounded by buoyant system that oscillates, wherein the piston plate is coupled to the buoyant system with a linkage system, wherein the buoyant system, linkage system, and piston plate move in response to wave energy, and wherein air enters a first opening and leaves from a second opening formed in a structural support of the facility in response to movement of the piston plate, incorporating a variable tuning orifice within the columnar volume of the support structure to finely regulate oscillation of the system, utilizing the air flow to drive a turbine that is coupled with an electric power-generating device so as to generate electric power, and using the electric power to power devices on the offshore, nearshore or onshore facility.

In other embodiments, the present invention is directed to a method for producing fresh water from seawater using wave energy, the method comprising the steps of incorporating a structural support into an offshore, nearshore or onshore facility, wherein the structural support comprises a movable piston plate therein, wherein the structural support is surrounded by buoyant system that oscillates at a prescribed rate controlled by a variable tuning orifice, wherein the piston plate is coupled to the buoyant system with a linkage system, wherein the buoyant system, linkage system, and piston plate move in response to wave energy, and wherein air and water enter a first opening and leave from a second opening formed in a structural support of the facility in response to movement of the piston plate and utilizing the water flow across a desalination unit so as to generate fresh water.

In yet other embodiments, the present invention is directed to a method for pumping water using wave energy, the method comprising the steps of incorporating a structural support into an offshore, nearshore or onshore facility, wherein the structural support comprises a movable piston plate therein, wherein the structural support is surrounded by buoyant system that oscillates at a prescribed rate controlled by a variable tuning orifice, wherein the piston plate is coupled to the buoyant system with a linkage system, wherein the buoyant system, linkage system, and piston plate move in response to wave energy, and wherein air and water enter a first opening and leave from a second opening formed in a structural support of the facility in response to movement of the piston plate and utilizing the water flow across a pumping unit so as to pump water for pumping applications.

Therefore, the present invention is well adapted to attain the ends and advantages mentioned as well as those that are inherent therein. The particular embodiments disclosed above are illustrative only, as the present invention may be modified and practiced in different but equivalent manners apparent to those having ordinary skill in the art having the benefit of the teachings herein. While numerous changes may be made by those having ordinary skill in the art, such changes are encompassed within the spirit and scope of this invention. Furthermore, no limitations are intended to the details of construction or design herein shown. It is therefore evident that the particular illustrative embodiments disclosed above may be altered or modified and all such variations are considered within the scope and spirit of the present invention.

What is claimed:

1. A system for producing an output from wave energy for use on an offshore, nearshore or onshore facility, the system comprising:
   a) a support structure having a columnar volume with a first opening and a second opening and a movable piston plate housed therein;
   b) a buoyant system coupled to the movable piston plate by a linkage system and surrounding the support structure; and
   c) a variable tuning orifice configured to regulate oscillations of the buoyant system,
wherein the piston plate shifts in response to an oscillation of water level causing the buoyant system to shift.

2. The system of claim 1, further comprising a turbine housed in the columnar volume of the support structure, wherein the turbine rotates in response to air flow through the columnar volume.

3. The system of claim 2, further comprising a rotating alternator driven by the turbine.

4. The system of claim 3, wherein the rotating alternator is arranged and designed to generate electrical power loads in excess of 50 kW.

5. The system of claim 3, further comprising an air opening located above the turbine.

6. The system of claim 3, further comprising a power take-off cable connected to the rotating alternator to power one or more electrical devices associated with the facility.

7. The system of claim 1, further comprising a plenum jacket disposed along an edge of said support structure arranged and designed to increase flow volume inside and/or outside of said support structure.

8. The structure of claim 1, wherein an air flow within the columnar volume varies in response to the oscillation of water level.

9. The structure of claim 1, wherein such oscillation is realized at a prescribed rate controlled by the variable tuning orifice.

10. The structure of claim 1, further comprising a water inlet within the columnar volume.

11. The system of claim 1, further comprising a desalination unit housed in the columnar volume of the support structure for removing salts and other minerals from seawater to produce fresh water.

12. The system of claim 1, further comprising a pumping unit housed in the columnar volume of the support structure for pumping water.

13. The system of claim 1, further comprising a plenum jacket disposed along an edge of said support structure arranged and designed to increase flow volume inside and/or outside of said support structure.

14. The system of claim 1, wherein air flow within the columnar volume varies in response to the oscillation of water level, and wherein such oscillation is realized at a prescribed rate controlled by a variable tuning orifice.

15. The system of claim 1, wherein water flow within the columnar volume varies in response to the oscillation of water level, and wherein such oscillation is realized at a prescribed rate controlled by a variable tuning orifice.

16. A method for producing an output from wave energy for use on an offshore, nearshore or onshore facility, the method comprising the steps of:
  a) incorporating a structural support having a columnar volume into said offshore, nearshore or onshore facility, wherein the structural support comprises a movable piston plate therein, wherein the structural support is surrounded by buoyant system that oscillates, wherein the piston plate is coupled to the buoyant system with a linkage system, wherein the buoyant system, linkage system, and piston plate move in response to wave energy, and wherein air enters a first opening and leaves from a second opening formed in a structural support of the facility in response to movement of the piston plate; and
  b) incorporating a variable tuning orifice within the columnar volume of the support structure to finely regulate oscillation of the system.

17. The method of claim 16, further comprising utilizing the air flow to drive a turbine that is coupled with an electric power-generating device so as to generate electric power and using the electric power to power devices on the offshore, nearshore or onshore facility.

18. The method of claim 16, wherein water enters said first opening and leaves from said second opening formed in said structural support in response to movement of said piston plate.

19. The method of claim 18, further comprising utilizing said water flow across a desalination unit so as to generate fresh water.

20. The method of claim 18, further comprising utilizing said water flow across a pumping unit so as to pump water for pumping applications.

* * * * *